US012679393B2

(12) United States Patent  (10) Patent No.:   US 12,679,393 B2
Oguri et al.  (45) Date of Patent:   Jul. 14, 2026

(54) VEHICLE

(71) Applicant: TOYOTA JIDOSHA KABUSHIKI KAISHA, Toyota (JP)

(72) Inventors: Haruki Oguri, Toyota (JP); Kenichi Yamada, Nisshin (JP); Go Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/411,399

(22) Filed: Jan. 12, 2024

(65) Prior Publication Data

US 2024/0326844 A1    Oct. 3, 2024

(30) Foreign Application Priority Data

Mar. 27, 2023    (JP) ................................. 2023-050333

(51) Int. Cl.
B60W 50/038     (2012.01)
B60W 30/09     (2012.01)
B60W 60/00     (2020.01)

(52) U.S. Cl.
CPC .......... B60W 50/038 (2013.01); B60W 30/09 (2013.01); B60W 60/0015 (2020.02)

(58) Field of Classification Search
CPC ............... B60W 50/038; B60W 30/09; B60W 60/0015; B60W 60/0053; B60W 60/007; B60W 30/095; B60W 2420/403
See application file for complete search history.

(56) References Cited

U.S. PATENT DOCUMENTS

| | | | |
|---|---|---|---|
| 2019/0070957 A1* | 3/2019 | Nakatsuka | B60K 28/06 |
| 2019/0300008 A1 | 10/2019 | Ando | |
| 2020/0269876 A1* | 8/2020 | Ando | B60W 60/0053 |
| 2022/0289249 A1* | 9/2022 | Imai | B60W 60/0059 |

FOREIGN PATENT DOCUMENTS

JP        2019-177807 A    10/2019

OTHER PUBLICATIONS

Reschka, Andreas, et al. "A surveillance and safety system based on performance criteria and functional degradation for an autonomous vehicle." 2012 15th International IEEE Conference on Intelligent Transportation Systems. IEEE, 2012. (Year: 2012).*

* cited by examiner

*Primary Examiner* — Russell Frejd
*Assistant Examiner* — Ana D Thomas
(74) *Attorney, Agent, or Firm* — SoraIP, Inc.

(57)     ABSTRACT

A vehicle includes a vehicle platform that controls the vehicle and an autonomous driving kit that transmits commands for autonomous driving to the vehicle platform. The vehicle platform includes an accelerator pedal, a first emergency stop system that stops the vehicle in the event of an abnormality in the autonomous driving kit, and a second emergency stop system that stops the vehicle in the event of an emergency situation for the driver. The autonomous driving kit requires the vehicle platform to inhibit acceleration of the vehicle with the accelerator pedal while the second emergency stop system is activated. The vehicle platform prohibits acceleration of the vehicle using the accelerator pedal while the first emergency stop system is activated, regardless of whether or not there is a request from the autonomous driving kit.

6 Claims, 5 Drawing Sheets

Figure 5:
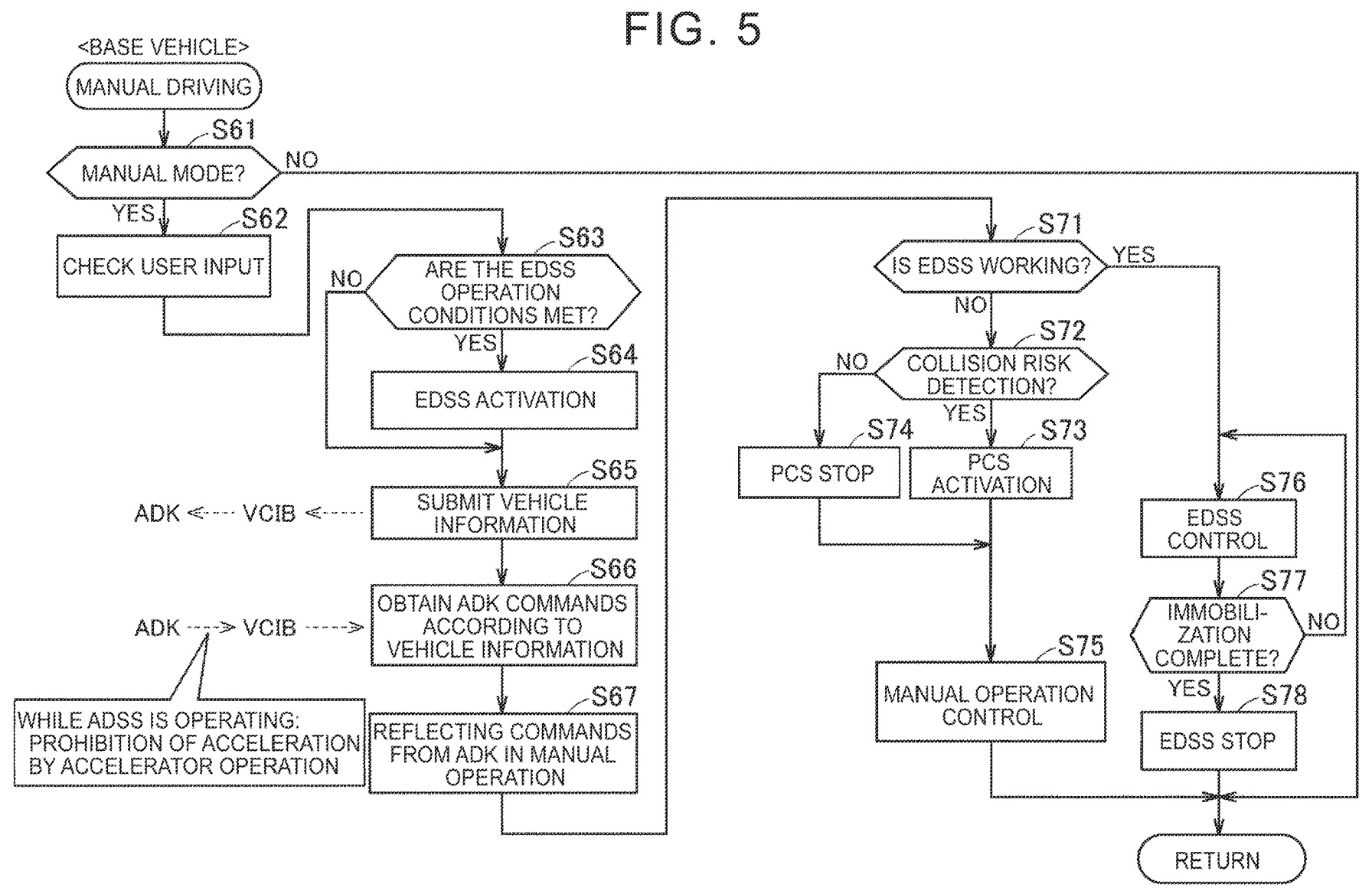

<BASE VEHICLE>
MANUAL DRIVING

S61

MANUAL MODE? — NO

YES

S62
CHECK USER INPUT

S63
ARE THE EDSS OPERATION CONDITIONS MET? — NO

YES

S64
EDSS ACTIVATION

S65
SUBMIT VEHICLE INFORMATION

S66
OBTAIN ADK COMMANDS ACCORDING TO VEHICLE INFORMATION

S67
REFLECTING COMMANDS FROM ADK IN MANUAL OPERATION

ADK ◄---- VCIB

ADK ----► VCIB

WHILE ADSS IS OPERATING: PROHIBITION OF ACCELERATION BY ACCELERATOR OPERATION

S71
IS EDSS WORKING? — YES

NO

S72
COLLISION RISK DETECTION? — YES

NO

S73
PCS ACTIVATION

S74
PCS STOP

S75
MANUAL OPERATION CONTROL

S76
EDSS CONTROL

S77
IMMOBILIZATION COMPLETE? — NO

YES

S78
EDSS STOP

RETURN

VEHICLE

CROSS-REFERENCE TO RELATED APPLICATION

This application claims priority to Japanese Patent Application No. 2023-050333 filed on Mar. 27, 2023 incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177807 (JP 2019-177807 A) discloses a vehicle equipped with an autonomous driving kit.

SUMMARY

Even in the vehicle equipped with the autonomous driving kit, a person (driver) who drives the vehicle may be present in the vehicle and the driver may perform manual driving as necessary. Therefore, it is conceivable to provide the vehicle with an emergency stop system that stops the vehicle when an emergency situation occurs for the driver (for example, when the driver has difficulty in driving due to his/her poor physical condition). When the driver is stuck with an accelerator pedal depressed, however, acceleration control in response to the accelerator pedal operation may hinder the emergency vehicle stop by the emergency stop system.

The present disclosure has been made to solve the above problem, and an object of the present disclosure is to appropriately stop a vehicle in an emergency by using an emergency stop system for the vehicle.

A vehicle according to one aspect of the present disclosure includes a vehicle platform (hereinafter referred to as "VP") configured to control the vehicle, and an autonomous driving kit (hereinafter referred to as "ADK") configured to transmit a command for autonomous driving to the VP.

The VP includes an accelerator pedal to be operated by a driver to accelerate the vehicle, a first emergency stop system configured to stop the vehicle when an abnormality occurs in the ADK, and a second emergency stop system configured to stop the vehicle when an emergency situation occurs for the driver.

The ADK is configured to request the VP to prohibit acceleration of the vehicle using the accelerator pedal while the second emergency stop system is operating.

The VP is configured to prohibit the acceleration of the vehicle using the accelerator pedal while the first emergency stop system is operating regardless of whether a request is given from the ADK.

According to the present disclosure, it is possible to appropriately stop the vehicle in the emergency by using the emergency stop system for the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing details of the control system of the vehicle shown in FIG. 1;

FIG. 5 is a flowchart showing details of processing related to manual driving in the vehicle control shown in FIG. 3.

DETAILED DESCRIPTION OF EMBODIMENTS

Figure 1:
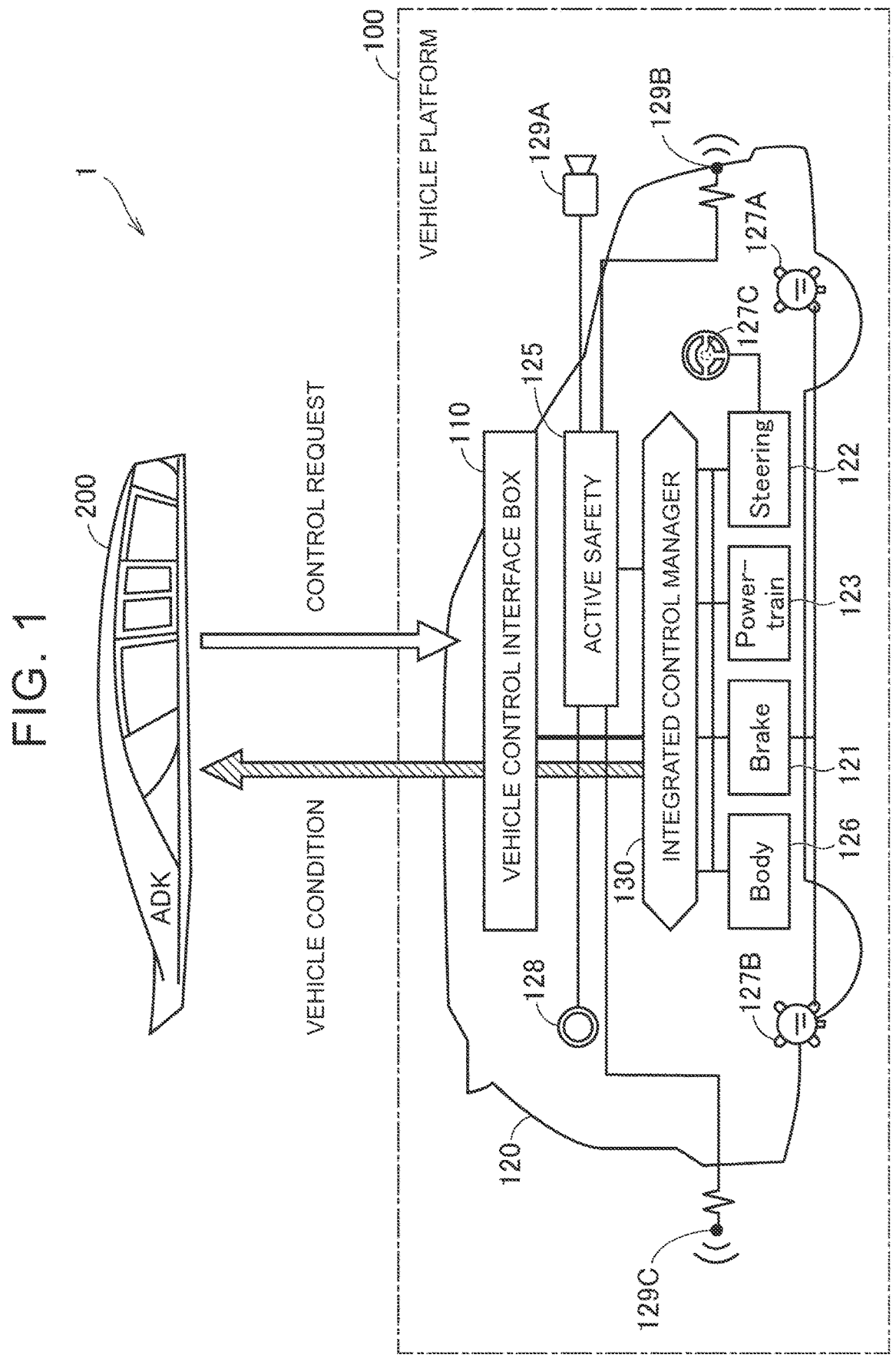
FIG. 1 is a diagram showing a schematic configuration of a vehicle according to an embodiment of the present disclosure.

Hereinafter, an embodiment of the present disclosure will be described in detail with reference to the drawings. In the drawings, the same or corresponding portions are denoted by the same reference signs and the description thereof will not be repeated.

FIG. 1 is a diagram showing a schematic configuration of a vehicle according to an embodiment of the present disclosure. Referring to FIG. 1, vehicle 1 includes a vehicle platform (VP) 100 and an autonomous driving kit (ADK) 200. VP 100 includes a vehicle control interface box (hereinafter referred to as "VCIB") 110 and a base vehicle 120. By adding VCIB 110 to base vehicle 120, VP 100 to which ADK 200 can be attached and detached is formed. VCIB 110 is configured to communicate with both base vehicle 120 and ADK 200 via a communication bus. Then, the vehicle 1 is completed by attaching the ADK 200 to the VP 100. In this embodiment, ADK 200 is attached to the rooftop of base vehicle 120. However, the attachment position of the ADK 200 can be changed as appropriate.

The base vehicle 120 is, for example, a commercially available electrified vehicle (xEV). In this embodiment, a battery electric vehicle (BEV) is employed as the base vehicle 120. However, the base vehicle 120 is not limited to this, and may be an xEV other than a BEV. The base vehicle 120 includes an integrated control manager 130 and various systems and various sensors (wheel speed sensors 127A, 127B, steering angle sensor 127C, etc.) for controlling the base vehicle 120. The integrated control manager 130 functions as a control device. The integrated control manager 130 integrates and controls various systems related to the operation of the base vehicle 120 based on the detection results of the on-vehicle sensors.

Figure 2:
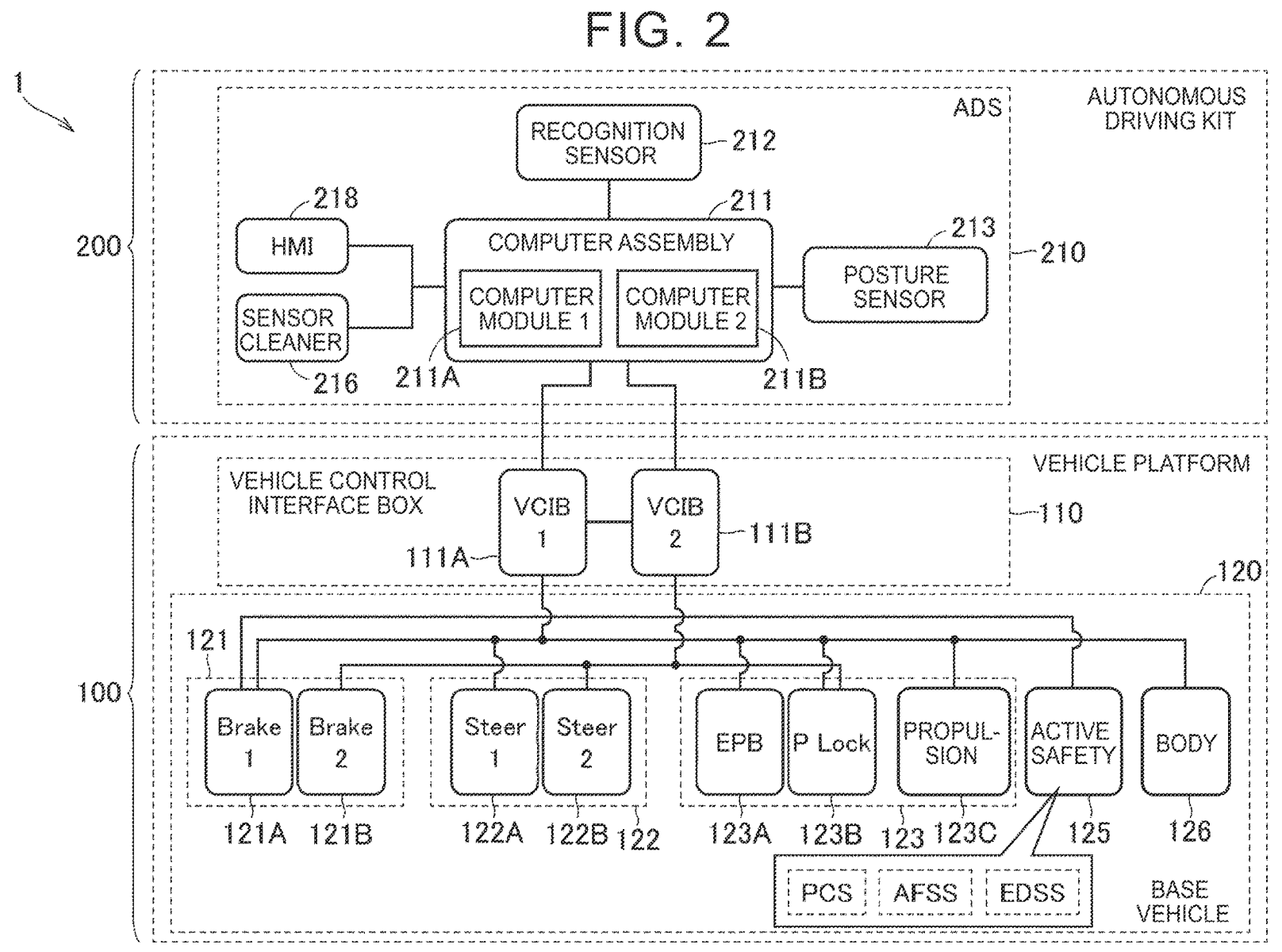

FIG. 2 is a diagram showing details of the control system of the vehicle 1. Referring to FIG. 2 together with FIG. 1, ADK 200 includes an automatic driving system (hereinafter referred to as "ADS") 210 for automatically driving vehicle 1. ADS 210 includes a computer assembly (hereinafter referred to as "ADSCOM") 211, a recognition sensor 212, a posture sensor 213, a sensor cleaner 216, and a Human Machine Interface (HMI) 218.

ADSCOM 211 includes a first computer module (hereinafter referred to as "first ADC") 211A and a second computer module (hereinafter referred to as "second ADC") 211B. Each of the first ADC 211A and the second ADC 211B includes a processor and a storage device that stores automatic driving software using an API, which will be described later, and is configured such that the automatic driving software can be executed by the processor. The recognition sensor 212 includes a sensor that acquires information indicating the external environment of the vehicle 1 (hereinafter also referred to as "environmental information"). The recognition sensor 212 may include at least one of a camera, a millimeter wave radar, and a lidar. The posture sensor 213 acquires information regarding the attitude of the vehicle 1 (hereinafter also referred to as "attitude information"). Posture sensor 213 may include various sensors that detect acceleration, angular velocity, and position of vehicle 1. HMI 218 includes input devices and notification devices.

The base vehicle 120 includes a brake system 121, a steering system 122, a power train system 123, an active safety system (hereinafter referred to as a "safety system") 125, and a body system 126. In this embodiment, each system includes an electronic control unit (hereinafter also referred to as "ECU").

In the vehicle 1, a control system related to the behavior of the vehicle 1 (running, stopping, turning) has redundancy. The first ADC 211A and the second ADC 211B give instructions to the main control system and the sub control system, respectively. The VCIB 110 includes a main control system control section (hereinafter referred to as "first VCIB") 111A and a sub control system control section (hereinafter referred to as "second VCIB") 111B. Each control unit may include a computer including a processor and a storage device. The first VCIB 111A and the second VCIB 111B may communicate with each system directly or via the integrated control manager 130 shown in FIG. 1.

Brake system 121 includes a braking mechanism, an operation section that receives a brake operation from a driver, and brake control sections 121A and 121B. Steering system 122 includes a steering mechanism, an operation section that receives steering operations from the driver, and steering control sections 122A and 122B. Powertrain system 123 includes a shift device, a vehicle drive device, an EPB device, a P-Lock device, an EPB control section 123A, a P-Lock control section 123B, and a propulsion control section 123C. "EPB" means electric parking brake, and "P-Lock" means parking lock. The shift device determines a shift range and switches the propulsion direction and shift mode of base vehicle 120 according to the determined shift range. In addition to the transmission mechanism, the shift device further includes an operation section that receives a shift operation from the driver. The vehicle drive device applies propulsive force in the propulsion direction indicated by the shift range. The vehicle drive device includes a battery and a running motor that receives power from the battery. The vehicle drive device further includes an accelerator pedal operated by the driver to accelerate the vehicle 1. In addition to the parking lock mechanism and actuator, the P-Lock device further includes an operation section that accepts a parking operation from the driver.

Safety system 125 includes a Pre Collision Safety (PCS) system, an Emergency Driving Stop System (EDSS), and an ADK Failure Stop System (AFSS).

The PCS system prevents a collision when it is determined that there is a risk of collision regarding the vehicle 1. The ECU of the safety system 125 determines the possibility of a collision with the running vehicle 1. The base vehicle 120 includes a camera 129A and radar sensors 129B and 129C (FIG. 1) for detecting collision risk. The ECU of the safety system 125 uses signals received from the camera 129A and radar sensors 129B and 129C to determine whether there is a risk of collision. If it is determined that there is a risk of collision, the ECU activates the PCS. This causes the PCS system to initiate a warning in the direction in which a collision risk is detected. If the risk of collision cannot be avoided by manual driving, the PCS system sequentially executes prefill control, braking control, and brake hold control. Prefill control is a control that applies hydraulic pressure to the extent that the clearance between the brake pad and the rotor is clogged before braking control to hasten the rise in brake deceleration. When the brake hold control is completed, the alarm stops and the EPB device is activated. The PCS system will continue to issue alerts until the risk of collision has disappeared. When the risk of collision disappears, the PCS becomes stopped (inactive).

EDSS causes the vehicle 1 to stop when an emergency situation arises for the driver. An emergency stop switch 128 (FIG. 1) is installed in the vehicle cabin of the vehicle 1 to notify the driver of an emergency situation. The number and installation location of emergency stop switches 128 are arbitrary. The emergency stop switch 128 is configured to be switched between an ON state and an OFF state in response to an operation by a passenger (user). The state (ON/OFF) of the emergency stop switch 128 is input to the ECU of the safety system 125. Emergency stop switch 128 may be a push button. A user in the vehicle can notify the base vehicle 120 that an emergency situation has occurred for the driver by turning on the emergency stop switch 128 (for example, by pressing a button).

AFSS stops the vehicle 1 when an abnormality occurs in the ADK 200. A method for detecting an ADK abnormality will be described later (see S23 and S26 in FIG. 3). When a predetermined first operation condition is satisfied in autonomous mode, AFSS is activated. When a predetermined second operation condition is satisfied in the manual mode, the EDSS is activated. These emergency stop systems assist in stopping the vehicle. Specifically, the activated AFSS or EDSS sequentially executes deceleration control to reduce the vehicle speed (lower speed), deceleration control to stop the vehicle, and stop holding control to maintain the stopped state. Then, when the stop holding control is completed, the EPB device is activated. The ADK 200 is notified of the operating status of the emergency stop system by the emergency stop status, which will be described later.

In this embodiment, the AFSS, EDSS, and PCS systems correspond to examples of the "first emergency stop system", "second emergency stop system", and "collision prevention system" according to the present disclosure, respectively. Various control devices included in the base vehicle 120 function individually or in cooperation as a "first control device" according to the present disclosure. Each of the first ADC 211A and the second ADC 211B functions as a "second control device" according to the present disclosure. Further, each of the first VCIB 111A and the second VCIB 111B functions as a "third control device" according to the present disclosure.

In this embodiment, signals defined by an Application Program Interface (API) (API signals) are used for communication between the ADK 200 and the VCIB 110. The ADK 200 is configured to process various signals defined by the API. ADK 200 outputs various commands to VCIB 110 according to the API. In the following, each of the above various commands output from the ADK 200 to the VCIB 110 is also referred to as an "API command." Further, the ADK 200 receives various signals indicating the status of the base vehicle 120 from the VCIB 110 according to the above API. In the following, each of the above various signals that the ADK 200 receives from the VCIB 110 will also be referred to as "API status." Both API commands and API status correspond to API signals.

In this embodiment, ADK 200 uses API commands described below. A vehicle mode command is an API command that requests a transition to autonomous mode or manual mode. The autonomous mode and manual mode will be described later. The propulsion direction command is an API command that requests switching of the shift range (R/D). The acceleration command is an API command that instructs the acceleration of the vehicle. The acceleration command requests acceleration (+) and deceleration (−) in the direction indicated by the propulsion direction status, which will be described later. An immobilization command is an API command that requests the application or removal of immobilization. Application of immobilization means turning on the EPB (operating state) and setting the shift range to P (parking).

The EDSS accelerator pedal prohibition command (hereinafter referred to as "EDSS support command") is an API command for prohibiting accelerator override (vehicle acceleration using the accelerator pedal) for EDSS control. The EDSS support command is set to either a value "0" indicating permission for accelerator override or a value "1" indicating prohibition of accelerator override. While EDSS is in operation, ADK 200 prohibits accelerator override through the EDSS support command. By prohibiting accelerator override, accelerator pedal operation is prohibited, and the vehicle will not accelerate even if the driver depresses the accelerator pedal. Note that when the value of the AFSS operation status, which will be described later, is "1", the accelerator pedal operation is prohibited even if the value "0" is set to the EDSS support command.

The AFSS activation command is an API command for permitting or prohibiting the operation of AFSS. The AFSS activation command has a value of "0" indicating no request, a value of "1 (Activate AFSS)" that allows AFSS activation, and a value of "2 (Inactivate AFSS)" that prohibits AFSS activation. Either of these is set. However, while the AFSS is in operation, the base vehicle 120 (VP 100) does not accept an operation prohibition request (AFSS activation command=2) from the ADK 200.

The safety system drive control override command (hereinafter referred to as "preventive change command") is an API command for prohibiting or canceling the operation of the PCS. However, ADK 200 can inhibit or cancel operation of the PCS through a preventive change command only when the vehicle mode is autonomous mode.

Some API commands used in the vehicle 1 have been described above. VCIB 110 receives various API commands from ADK 200. When VCIB 110 receives an API command from ADK 200, VCIB 110 converts the API command into a signal format that can be executed by the control device of base vehicle 120. Hereinafter, the API command converted into a signal format executable by the control device of the base vehicle 120 will also be referred to as an "internal command." Upon receiving an API command from ADK 200, VCIB 110 outputs an internal command corresponding to the API command to base vehicle 120.

Next, API status will be explained. The ADK 200 grasps the state of the base vehicle 120 using, for example, the API status described below.

The vehicle mode status is an API status indicating the vehicle mode state. Vehicle modes include manual mode, autonomous mode, and standby mode. Manual mode is a vehicle mode in which the vehicle is under the control of a driver (human). Autonomous mode is a vehicle mode in which the vehicle platform (including the base vehicle) is under the control of an autonomous driving kit. Standby mode is a vehicle mode in which movement of the vehicle is prohibited. In the initial state, the vehicle mode is manual mode. The driver can select a desired vehicle mode through the in-vehicle HMI. The base vehicle 120 determines the vehicle mode in consideration of the situation of the vehicle 1 and the driver's selection. The vehicle mode status outputs the corresponding values "0", "1", and "2" when the current vehicle mode is manual mode, autonomous mode, or standby mode, respectively.

The propulsion direction status is an API status indicating the current shift range. The traveling direction status is an API status indicating the traveling direction of the vehicle. The heading status has a value of "0" when the vehicle is moving forward, a value of "1" when the vehicle is moving backward, and a value of "2 (Standstill)" when all wheels (4 wheels) exhibit a speed of "0" for a certain period of time. Output. The vehicle speed status is an API status indicating the longitudinal speed of the vehicle. The vehicle speed status outputs the absolute value of the vehicle speed. Immobilization status is an API status that indicates the state of immobilization (e.g., the state of EPB and shift P).

The AFSS operation status is an API status indicating the activation state of AFSS. The AFSS operation status outputs the value "1 (AFSS Active)" when the AFSS operation is permitted, and the value "2 (AFSS Inactive)" when the AFSS operation is prohibited. Immediately after the computer of the VCIB 110 starts up, the AFSS operation status outputs the value "0 (Unknown)". In this embodiment, one of the conditions for the vehicle mode to transition to autonomous mode is that the AFSS operation status indicates "1" or "2". Therefore, when the vehicle mode is manual mode, the ADK 200 determines whether to permit or prohibit the activation of AFSS based on the AFSS activation command. The ADK 200 can enable/disable the AFSS function using an AFSS activation command. However, the ADK 200 cannot enable/disable the EDSS function.

The safety system alarm status (hereinafter referred to as "first prevention status") is an API status indicating the state of the safety system (alarm). The safety system drive control status (hereinafter referred to as "second prevention status") is an API status indicating the state of the safety system (drive control). The first and second prevention statuses indicate the operating status of the PCS.

The ADS/safety system arbitration status (hereinafter referred to as "first arbitration status") is an API status indicating the result of arbitration between the ADS request and the safety system request. The arbitrated requested acceleration of the ADS/safety system (hereinafter referred to as "second arbitration status") is an API status indicating the requested acceleration after the ADS and the safety system have been arbitrated. The second arbitration status outputs the requested acceleration as ground acceleration. A positive value of the required acceleration means a request for acceleration, and a negative value of the required acceleration means a request for deceleration.

When both the safety system 125 and the ADS 210 request acceleration, if the acceleration requested by the safety system 125 is smaller than the acceleration requested by the ADS 210, the first arbitration status outputs "1" and the request by the ADS 210 is The acceleration is selected and the second arbitration status outputs the requested acceleration (positive value) by ADS 210. When both the safety system 125 and the ADS 210 request deceleration, if the deceleration requested by the safety system 125 (absolute value) is larger than the deceleration requested by the ADS 210 (absolute value), the first arbitration status is "2". "is output, the deceleration requested by the safety system 125 is selected, and the deceleration requested by the safety system 125 (negative acceleration) is output as the second arbitration status.

The VP emergency stop system status (hereinafter referred to as "emergency stop status") is an API status indicating the operating status of the emergency stop system (AFSS or EDSS). The emergency stop status outputs a value of "0" when the emergency stop system is not operating, and outputs a value of "1" when the emergency stop system is operating.

The communication system performance degradation status (hereinafter referred to as "communication abnormality status") is an API status indicating ADK communication abnormality information that may affect automatic driving. The communication error status has a value of "0 (Normal)" when there is no communication error with the ADK 200, and a value of "7 (Loss of function)" when there is a possibility that communication with the ADK 200 has failed.

Some API statuses used in the vehicle 1 have been described above. The VCIB 110 receives various sensor detection values and status determination results from the base vehicle 120 and outputs various API statuses indicating the status of the base vehicle 120 to the ADK 200. The VCIB 110 obtains an API status in which a value indicating the state of the base vehicle 120 is set, and outputs the obtained API status to the ADK 200.

Figure 3:
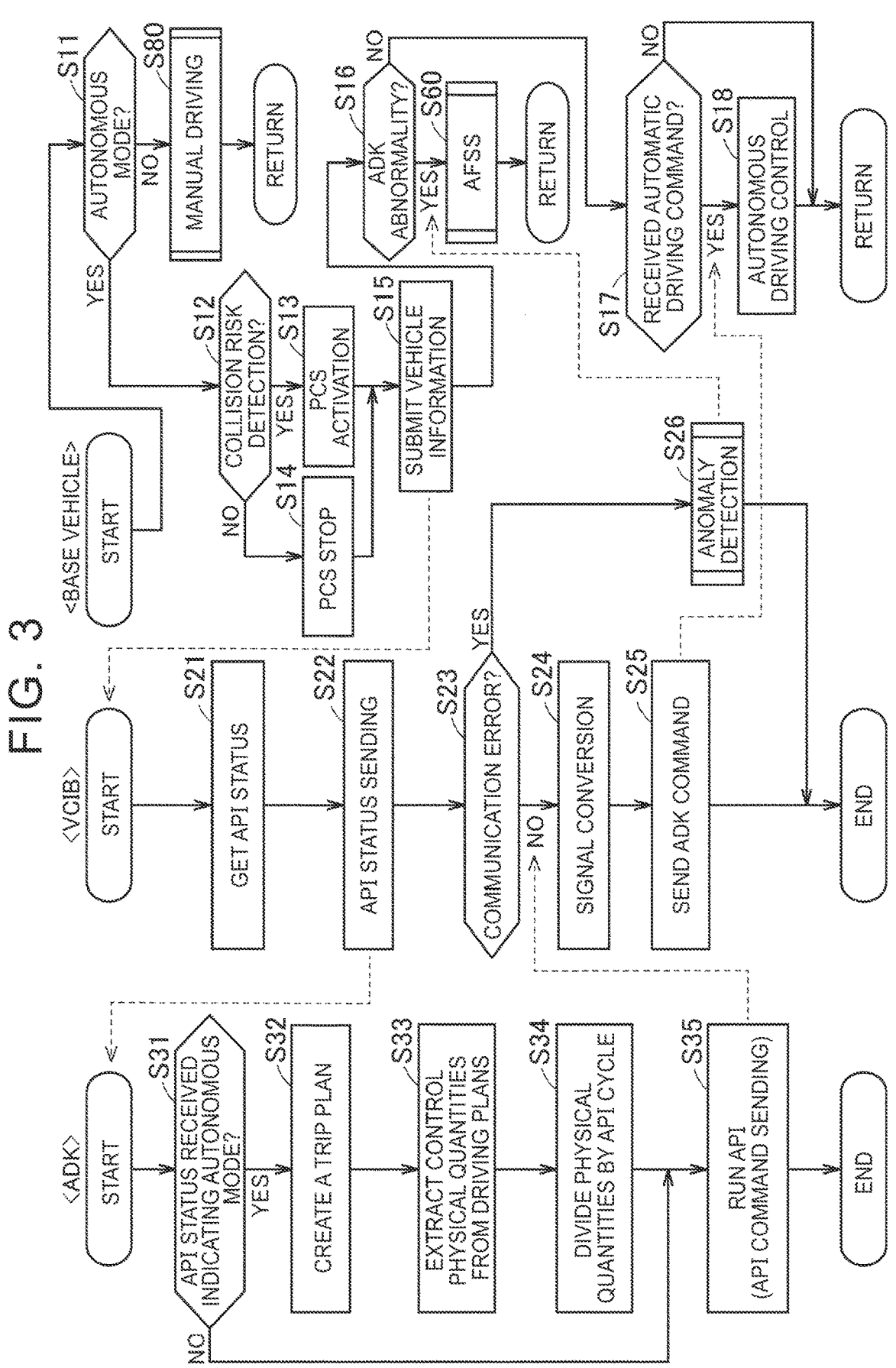
FIG. 3 is a flowchart showing vehicle control according to an embodiment of the present disclosure.

FIG. 3 is a flowchart for explaining control of the vehicle 1 (particularly autonomous driving control during normal operation) according to this embodiment. Each step in the flowchart is simply written as "S".

Referring to FIG. 3, a series of processes from S11 to S15 is executed by any one of a plurality of control devices included in base vehicle 120 (for example, the integrated control manager 130 and the control devices of each system shown in FIGS. 1 and 2). is executed repeatedly. In S11, the base vehicle 120 determines whether the vehicle mode of the vehicle 1 is the autonomous mode. If the vehicle mode is autonomous mode (YES in S11), the process advances to S12. In S12, the safety system 125 determines whether there is a risk of collision. If there is a collision risk (YES in S12), the PCS is activated in S13, and if there is no collision risk (NO in S12), the PCS is stopped in S14. After that, the process proceeds to S15.

In S15, the base vehicle 120 obtains current vehicle information and transmits the obtained vehicle information to the VCIB 110. The current vehicle information includes information indicating that the vehicle mode is autonomous mode, various sensor detection values indicating the current state of the base vehicle 120, and state determination results based on user operations or sensor detection values. In addition, the current vehicle information further includes information indicating the status of the safety system 125 (PCS, etc.), and if arbitration is performed between the operating PCS and ADS (see S18 described below), It further includes information indicating the arbitration result and the requested acceleration after arbitration. The base vehicle 120 may store the current vehicle information in a storage device in association with the acquisition time.

In subsequent S16, the base vehicle 120 determines whether an ADK failure has occurred. In this embodiment, if the base vehicle 120 has not received a notification indicating an ADK abnormality (S41 in FIG. 4, which will be described later), the base vehicle 120 determines that an ADK abnormality has not occurred (NO in S16), and the process advances to S17. In S17, the base vehicle 120 determines whether an automatic driving command from the ADK 200 has been received. If the base vehicle 120 has not received the automatic driving command (NO in S17), the process returns to the first step (S11). In autonomous mode, while an ADK abnormality has not occurred and an automatic driving command has not been received, steps S11 to S17 described above are repeatedly executed.

A series of processes from S21 to S26 are basically executed by the first VCIB 111A. However, if an abnormality occurs in the first VCIB 111A, the second VCIB 111B executes each process instead of the first VCIB 111A. When the VCIB 110 receives the current vehicle information from the base vehicle 120, it starts a series of processes from S21 to S26.

In S21, the VCIB 110 acquires the API status (e.g., the various API statuses described above) indicating the current state of the base vehicle 120 based on the current vehicle information. VCIB 110 may determine values for various API statuses based on various sensor detection values. The VCIB 110 may store the acquired values of various API statuses in a storage device in association with the acquisition time. In the following S22, the VCIB 110 transmits the various API statuses acquired in S21 to the ADK 200. After that, the process proceeds to S23.

A series of processes from S31 to S35 are basically executed by the first ADC 211A. However, if an abnormality occurs in the first ADC 211A, the second ADC 211B executes each process instead of the first ADC 211A. When the ADK 200 receives the above API status from the VCIB 110, it starts a series of processes from S31 to S35.

In S31, the ADK 200 determines whether the received vehicle mode status indicates autonomous mode. If the vehicle mode status does not indicate autonomous mode (NO in S31), the ADK 200 issues API commands that support vehicle control in manual mode in S35 without creating a travel plan for automatic driving. The data is transmitted to the VCIB 110 (see S65 and S66 in FIG. 5, which will be described later). On the other hand, if the vehicle mode status indicates autonomous mode (YES in S31), the ADK 200 advances the process to S32.

In S32, the ADK 200 creates a travel plan based on the detection results of various sensors (for example, environmental information and posture information) and the API status acquired from the VCIB 110. The travel plan is data indicating the target behavior of the vehicle 1 during a predetermined period. ADK 200 may calculate the behavior (posture, etc.) of vehicle 1 and create a travel plan suitable for the state of vehicle 1 and the external environment. In this embodiment, when the ADK 200 receives a communication abnormality status indicating the value "7", the second ADC 211B creates a travel plan for limp home travel (for example, travel to a safe parking space). create. Additionally, the ADK 200 can inhibit or cancel operation of the PCS through preventive change commands.

In subsequent S33, the ADK 200 extracts control physical quantities (acceleration, tire turning angle, etc.) from the travel plan created in S32. In subsequent S34, the ADK 200 divides the physical quantity extracted in S33 for each API cycle. In the following S35, the ADK 200 executes the API using the physical quantities divided in S34. Specifically, the ADK 200 determines the values of various API commands based on the physical quantities divided in S34. As a result, API commands for realizing physical quantities according to the travel plan can be obtained. The ADK 200 may store the obtained API command in the storage device together with the value of each API status received from the VCIB 110 in association with the acquisition time. ADK 200 then sends the obtained API command to VCIB 110. The API command indicates a command (including an automatic driving command) to the base vehicle 120. When the process of S35 is executed, the process flow of S31 to S35 ends. However, this processing flow is started every time the ADK 200 receives the API status (S22). Therefore, while the vehicle mode is the autonomous mode and no ADK abnormality occurs, commands for automatic driving are continuously issued from the ADK 200.

After transmitting the API status (S22), the VCIB 110 determines whether an abnormality has occurred in the communication between the ADK 200 and the VCIB 110 in S23. The VCIB 110 may determine whether there is a communication abnormality caused by a disconnection by checking for a disconnection in the communication line. Further, the VCIB 110 may transmit a confirmation signal to the ADK 200 and determine whether there is a communication abnormality based on the presence or absence of a reply from the ADK 200. Further, the VCIB 110 may determine that a communication abnormality has occurred when an API command is not received within a predetermined time after transmitting the API status. If there is an abnormality in the communication between at least the first ADC 211A and the VCIB 110, YES is determined in S23.

If there is no abnormality in the communication between the ADK 200 and the VCIB 110 (NO in S23), the VCIB 110 receives the above API command (S35). In the following S24, the VCIB 110 converts each received API command into an internal command. Through such signal conversion, internal commands corresponding to various API commands can be obtained. In subsequent S25, VCIB 110 transmits the obtained internal command to base vehicle 120. In autonomous mode, an internal command for automatic driving (automatic driving command) is transmitted in S25. When the process of S25 is executed, the process flow of S21 to S26 ends. However, the process flow is initiated each time VCIB 110 receives vehicle information from base vehicle 120.

Upon receiving the automatic driving command (S25) (YES in S17), the base vehicle 120 executes autonomous driving control in accordance with the received automatic driving command in subsequent S18. If the PCS is in operation and the acceleration or deceleration requested by the ADK 200 and the acceleration or deceleration requested by the PCS system are different, the base vehicle 120 uses one requested acceleration (acceleration: positive value, deceleration: negative value). Then, the base vehicle 120 executes autonomous driving control according to the requested acceleration after arbitration. Through the process of S18, automatic driving of the vehicle 1 is executed. After that, the process returns to the first step S11.

If an abnormality has occurred in the communication between the ADK 200 and the VCIB 110 (YES in S23), the VCIB 110 executes processing when an ADK abnormality is detected in S26. Then, in the process of S26, the base vehicle 120 determines that an ADK abnormality has occurred (YES in S16), and executes the process related to AFSS in the subsequent S60.

Figure 4:
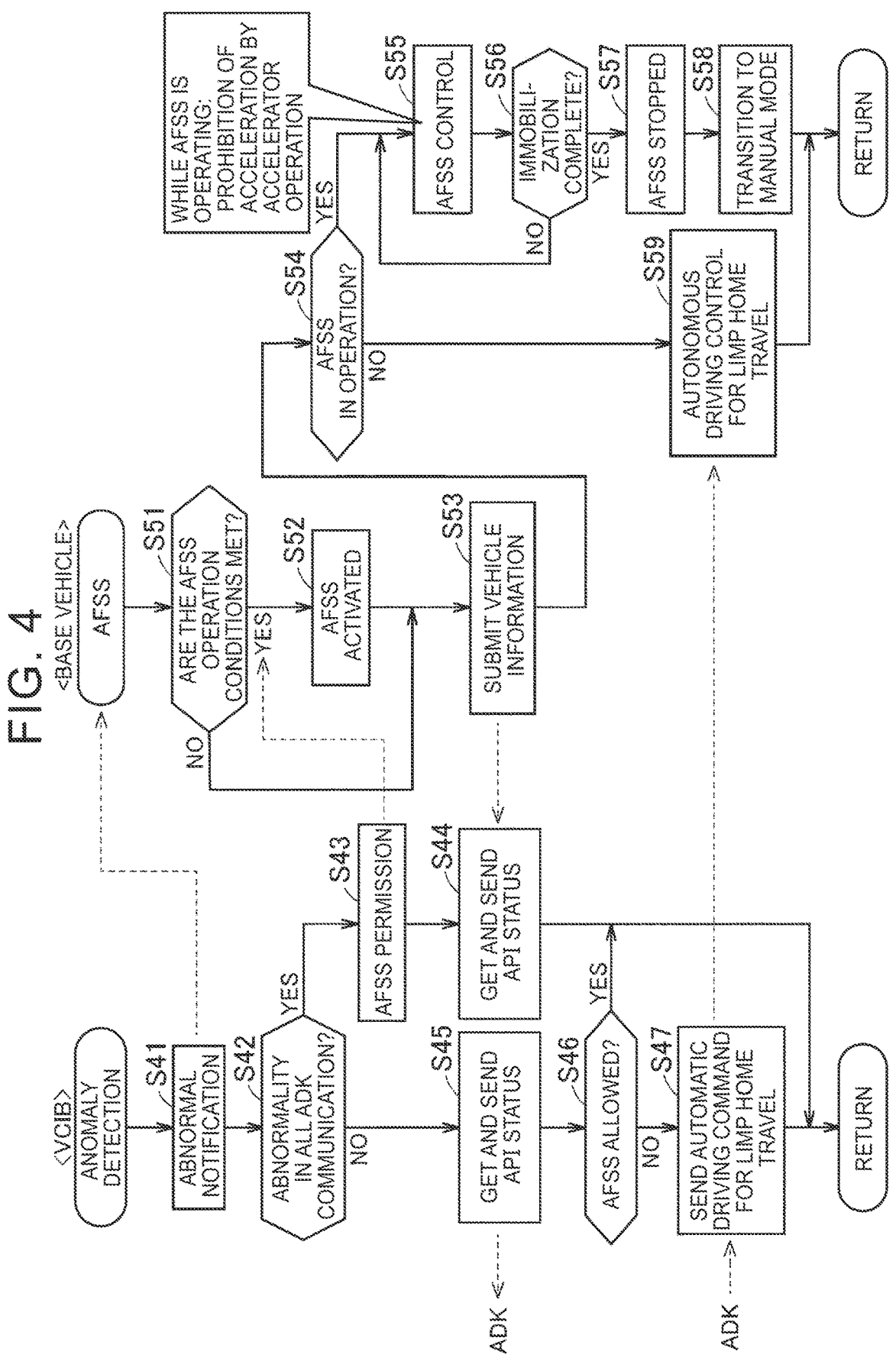
FIG. 4 is a flowchart showing details of processing related to AFSS in vehicle control shown in FIG. 3.

FIG. 4 is a flowchart showing details of S26 and S60. In FIG. 4, a series of processes from S41 to S47 corresponds to the process at S26 (FIG. 3), and a series of processes from S51 to S59 corresponds to the process at S60 (FIG. 3).

Referring to FIG. 4, in S41, VCIB 110 transmits a notification of ADK abnormality to base vehicle 120. In the following S42, the VCIB 110 determines whether or not there is an abnormality in the communication of all ADS computers (in this embodiment, the first ADC 211A and the second ADC 211B). If an abnormality has occurred in the communications of all ADS computers (YES in S42), the VCIB 110 transmits an AFSS activation command indicating the value "1 (permitted)" to the base vehicle 120 in S43. After that, the process advances to S44. On the other hand, if the communication of any ADS computer is normal (NO in S42), the process proceeds to S45.

When the base vehicle 120 receives the notification in S41, it is determined YES in S16 in FIG. 3, and a series of processes from S51 to S59 are started. In S51, the base vehicle 120 determines whether the AFSS operation conditions are satisfied. In this embodiment, it is assumed that an abnormality has occurred in the communication between the ADK 200 and the VCIB 110 (first AFSS requirement), and that the AFSS activation command indicates the value "1 (permitted)" (second AFSS requirement). The AFSS operation condition is met when both of these requirements are met, and the AFSS operation condition is not met when at least one of these requirements is not met. Since the communication abnormality has been detected by the VCIB 110 as described above (S26 in FIG. 3), the first AFSS requirement is satisfied. If an abnormality occurs in the communication of both the first ADC 211A and the second ADC 211B, the base vehicle 120 receives an AFSS activation command indicating the value "1 (permission)" from the VCIB 110, so the second AFSS requirement is also met. is satisfied, and the AFSS operation condition is established. On the other hand, if an abnormality occurs in the communication of only the first ADC 211A, whether the second AFSS requirements are satisfied depends on the value of the AFSS activation command determined by the ADK 200.

In this embodiment, the AFSS operation condition (first operation condition) is established when an abnormality occurs in the communication of the ADK 200 in a state where the ADK 200 allows the operation of AFSS in the autonomous mode. These conditions make it easier for the AFSS to operate at appropriate timing. However, the AFSS operation conditions are not limited to these conditions and can be changed as appropriate. For example, the AFSS operation condition may be established when an abnormality occurs in the communication of the ADK 200, regardless of whether or not the ADK 200 permits the activation of the AFSS.

If the AFSS operation condition is satisfied (YES in S51), the AFSS is activated in S52, and then the process proceeds to S53. If the AFSS operation condition is not satisfied (NO in S51), the process proceeds to S53 without AFSS activation. In S53, similar to S15 in FIG. 3, the base vehicle 120 acquires current vehicle information and transmits it to the VCIB 110. The current vehicle information includes information indicating the operating status (operating/non-operating) of the AFSS.

The VCIB 110, which has received the current vehicle information from the base vehicle 120, acquires various API statuses indicating the current status of the base vehicle 120 based on the current vehicle information in S44 or S45, similar to S21 and S22 in FIG. 3 and send it to ADK 200. In both S44 and S45, the transmitted API status includes a communication abnormality status and an emergency stop status. The communication abnormality status shows the value "7". The emergency stop status indicates a value according to the determination result of S51. When the process of S44 is executed, the process flow ends. On the other hand, if the process of S45 is executed, the process proceeds to S46, which will be described later.

After transmitting the vehicle information in S53 described above, the base vehicle 120 determines whether the AFSS is in operation in the following S54. If AFSS is operating (YES in S54), base vehicle 120 executes AFSS control in subsequent S55. Under the AFSS control, the vehicle 1 is decelerated until it comes to a stop, and after it comes to a stop, it is held stopped and immobilized. While the AFSS is in operation, acceleration of the vehicle 1 using the accelerator pedal is prohibited. AFSS control (S55) is continued until immobilization is not completed (NO in S56). When the immobilization is completed (YES in S56), the AFSS becomes stopped (inactive) in S57, and the vehicle mode changes to manual mode in S58. After that, the process returns to the process flow of FIG. 3 and proceeds to S80, which will be described later.

In S46, the VCIB 110 determines whether or not the ADK 200 permits the operation of AFSS, and if the ADK 200 permits the operation of the AFSS (YES in S46), the processing flow ends. In this case, AFSS is activated in S52 described above. On the other hand, if ADK 200 prohibits the operation of AFSS (NO in S46), VCIB 110 transmits the command from ADK 200 to base vehicle 120 in S47. Specifically, when the ADK 200 receives the API status (S45), the second ADC 211B starts a series of processes from S31 to S35 in FIG. 3. The second ADC 211B generates an API command for limp home travel based on the received API status, and transmits it to the VCIB 110. In this case, AFSS does not operate (NO in S54). In S59, the base vehicle 120 executes autonomous driving control for limp home travel in accordance with the command (S47) received from the VCIB 110. After the processes of S47 and S59 are executed, the process returns to the process flow of FIG. 3. If the situation does not change, the above-described process is executed again in S26 and S60 of FIG. 3, and autonomous driving control for limp home travel is continued.

Referring again to FIG. 3, if the vehicle mode is not the autonomous mode (NO in S11), base vehicle 120 executes processing related to manual driving in S80. FIG. 5 is a flowchart showing details of S80.

Referring to FIG. 5, in S61, base vehicle 120 determines whether the vehicle mode is manual mode. If the vehicle mode is the standby mode, NO is determined in S61, and the process returns to the process flow (S11) in FIG. 3. If the vehicle mode is the manual mode (YES in S61), the base vehicle 120 confirms various user inputs to the vehicle 1 from the user in S62. User inputs include operations for manual driving by the driver and operations of the emergency stop switch 128 by the driver or passenger. In subsequent S63, the base vehicle 120 determines whether the EDSS operation conditions are satisfied. In this embodiment, the EDSS operation condition is satisfied when the emergency stop switch 128 is in the ON state, and the EDSS operation condition is not satisfied when the emergency stop switch 128 is in the OFF state.

In this embodiment, the EDSS operation condition (second operation condition) is established when the vehicle 1 receives an input notifying the driver that an emergency situation has occurred in the manual mode. These conditions make it easier for the EDSS to operate at appropriate timing. However, the input for activating the EDSS is not limited to the input corresponding to the user operation (for example, button operation) as described above, but may be a voice input. Further, the EDSS operation conditions can be changed as appropriate. For example, in a vehicle equipped with a system that detects when a driver is in an emergency situation (for example, a system that determines the driver's situation using image recognition), the system detects that the driver is in an emergency situation. In some cases, the EDSS operation condition may be satisfied.

If the EDSS operation condition is satisfied (YES in S63), the EDSS is activated in S64, and then the process proceeds to S65. If the EDSS operation condition is not satisfied (NO in S63), the process proceeds to S65 without EDSS activation. In S65, similar to S15 in FIG. 3, the base vehicle 120 acquires current vehicle information and transmits it to the VCIB 110. The current vehicle information includes information indicating the operating status (operating/non-operating) of the EDSS.

When the VCIB 110 receives the current vehicle information (S65), a series of processes from S21 to S26 in FIG. 3 is started. Through the process of S22, the ADK 200 receives various API statuses indicating the current status of the base vehicle 120. Then, in S35 of FIG. 3, the ADK 200 transmits to the VCIB 110 an EDSS support command indicating a value (I/O) according to the operating status (active/inactive) of the EDSS. Then, in S25 of FIG. 3, the VCIB 110 transmits an internal command (ADK command) corresponding to the API command (including the EDSS support command) received from the ADK 200 to the base vehicle 120.

The base vehicle 120 acquires the ADK command according to the current vehicle information from the VCIB 110 in S66. Subsequently, in S67, the base vehicle 120 reflects the ADK command in vehicle control in manual mode. For example, when the EDSS support command indicates the value "1", the base vehicle 120 disables the accelerator pedal operation among the driving operations (manual driving operations) by the driver confirmed in S62.

In subsequent S71, the base vehicle 120 determines whether the EDSS is in operation. If EDSS is operating (YES in S71), base vehicle 120 executes EDSS control in subsequent S76. Through the EDSS control, the vehicle 1 is decelerated until it comes to a stop, and after it comes to a stop, it is held stopped and immobilized. While the EDSS is in operation, the ADK 200 transmits an EDSS support command with a value of "1", so acceleration of the vehicle 1 using the accelerator pedal is prohibited by the process of S67. The base vehicle 120 may reflect manual driving operations (S62) other than accelerator operations in the EDSS control. The EDSS control (S76) continues until immobilization is not completed (NO in S77). When the immobilization is completed (YES in S77), the EDSS becomes stopped (inactive) in S78. After that, the process returns to the process flow (S11) in FIG. 3.

If the EDSS is not operating (NO in S71), the process advances to S72. In S72, the safety system 125 determines whether there is a risk of collision. If there is a risk of collision (YES in S72), the PCS is activated in S73, and if there is no risk of collision (NO in S72), the PCS is stopped in S74. After that, the process proceeds to S75. In S75, the base vehicle 120 executes manual driving control of the vehicle 1 according to the driving operation by the driver confirmed in S62. In this manual driving control, acceleration of the vehicle 1 using the accelerator pedal is permitted. After the process of S75 is executed, the process returns to the process flow (S11) of FIG. 3. If the EDSS operation condition is not satisfied in the manual mode, the above-described process is executed again in S80 of FIG. 3, and manual operation control is continued.

As explained above, the vehicle 1 according to this embodiment includes the VP 100 (vehicle platform) and the ADK 200 (autonomous driving kit). ADK 200 requests VP 100 to prohibit acceleration of vehicle 1 using the accelerator pedal while EDSS is in operation (see S65 to S67 in FIG. 5). While the AFSS is in operation, the VP 100 prohibits acceleration of the vehicle using the accelerator pedal, regardless of whether there is a request from the ADK 200 (see S55 in FIG. 4). In such a configuration, acceleration of the vehicle 1 using the accelerator pedal is prohibited in response to a request from the ADK 200 while the EDSS is in operation. Therefore, when an emergency situation arises for the driver, it becomes easier to appropriately stop the vehicle 1 using the EDSS. By the ADK 200 supporting the appropriate operation of the EDSS in this manner, the emergency stop performance of the VP 100 is improved. Further, while the AFSS is in operation, an abnormality occurs in the ADK 200. Therefore, VP 100 prohibits acceleration of vehicle 1 using the accelerator pedal, regardless of whether there is a request from ADK 200 or not. This makes it easier to appropriately stop the vehicle 1 using the AFSS when an abnormality occurs in the ADK 200. According to the above configuration, it becomes possible to appropriately stop the vehicle 1 using AFSS and EDSS in an emergency.

The embodiments disclosed this time should be considered to be illustrative in all respects and not restrictive. The technical scope indicated by the present disclosure is indicated by the claims rather than the description of the embodiments described above, and is intended to include meanings equivalent to the claims and all changes within the scope.

What is claimed is:

1. A vehicle comprising:

a vehicle platform configured to control the vehicle; and an autonomous driving kit configured to transmit a command for autonomous driving to the vehicle platform, wherein:

the vehicle platform includes:

an accelerator pedal to be operated by a driver to accelerate the vehicle;

a first emergency stop system configured to stop the vehicle when an abnormality occurs in the autonomous driving kit; and a second emergency stop system configured to stop the vehicle when an emergency situation occurs for the driver;

the autonomous driving kit is configured to request the vehicle platform to accelerate the vehicle when the driver operates the accelerator pedal;

the autonomous driving kit is configured to request the vehicle platform to prohibit acceleration of the vehicle using the accelerator pedal while the second emergency stop system is operating; and the vehicle platform is configured to prohibit the acceleration of the vehicle using the accelerator pedal while the first emergency stop system is operating despite the vehicle platform receiving a request for acceleration from the autonomous driving kit.

2. The vehicle according to claim 1, wherein:

the vehicle is configured to operate in an autonomous mode in which the vehicle platform is under control of the autonomous driving kit and in a manual mode in which the vehicle is under control of the driver;

the first emergency stop system is configured to operate when a first operation condition is satisfied in the autonomous mode; and the second emergency stop system is configured to operate when a second operation condition is satisfied in the manual mode.

3. The vehicle according to claim 2, wherein:

the first operation condition is satisfied when an abnormality occurs in communication of the autonomous driving kit in a state in which the autonomous driving kit permits an operation of the first emergency stop system; and the second operation condition is satisfied when the vehicle receives an input for notifying the vehicle that the emergency situation occurs for the driver.

4. The vehicle according to claim 1, wherein:

the vehicle platform further includes a collision prevention system configured to prevent a collision when determination is made that the vehicle has a collision risk; and the vehicle platform is configured to perform arbitration when an acceleration or a deceleration requested by the autonomous driving kit differs from an acceleration or a deceleration requested by the collision prevention system.

5. The vehicle according to claim 1, wherein:

the vehicle platform includes a base vehicle including a first control device;

the autonomous driving kit includes a second control device configured to determine a command related to autonomous driving control;

the vehicle platform further includes a vehicle control interface box including a third control device configured to communicate with both the first control device and the second control device;

the first control device is configured to transmit vehicle information related to the base vehicle to the third control device;

an application program interface signal defined in an application program interface is used for communication between the second control device and the third control device;

the application program interface signal includes an application program interface command indicating a command for the base vehicle, and an application program interface status indicating a status of the base vehicle;

the third control device is configured to convert the application program interface command from the second control device into a signal executable by the first control device, and transmit the signal executable by the first control device to the first control device; and the third control device is configured to acquire the application program interface status by using the vehicle information from the first control device, and transmit the acquired application program interface status to the second control device.

6. The vehicle according to claim 1, wherein the vehicle platform is configured to perform a request from the autonomous driving kit other than the request for acceleration while the first emergency stop system is operating.

* * * * *